United States Patent [19]
Fresard

[11] 3,776,336
[45] Dec. 4, 1973

[54] SCREW OPERATOR FOR CLUTCH WITH ADJUSTABLE STOP

[75] Inventor: Marcel Fresard, Petit-Lancy, Switzerland

[73] Assignee: Mefina S.A., Fribourg, Switzerland

[22] Filed: Apr. 6, 1972

[21] Appl. No.: 241,753

[30] Foreign Application Priority Data
Apr. 20, 1971 Switzerland................ 5715/71

[52] U.S. Cl............... 192/95, 192/94, 112/220, 85/1 P, 151/69
[51] Int. Cl........................................ F16d 19/00
[58] Field of Search............... 192/95, 97, 94, 109 R

[56] References Cited
UNITED STATES PATENTS

| 236,407 | 1/1881 | Anthony | 192/95 X |
| 2,863,410 | 12/1958 | Lange et al. | 192/95 X |
| 3,454,145 | 7/1969 | Gegauf | 192/95 X |

*Primary Examiner*—Benjamin W. Wyche
*Attorney*—Emory L. Groff et al.

[57] ABSTRACT

A shaft has at one end, a threaded portion, a cylindrical portion and a drive bush fixed thereto. The fly-wheel is mounted to rotate on the cylindrical portion of the shaft, a clamping block being screwed on the threaded portion to clamp the fly-wheel against the drive bush to lock it in rotation on the shaft. The possible angle of rotation of the block on the shaft is limited by a screw threaded in any one of at least two bores of the block to come into cooperation with a stop finger fast in rotation to the shaft and extending radially with respect to the latter. The bores are parallel to the axis of the shaft. The screw can be positioned in that one of the bores which provides the most favourable angle of rotation of the block between the coupling position of the fly-wheel and its uncoupled position.

6 Claims, 4 Drawing Figures

PATENTED DEC 4 1973  3,776,336

SCREW OPERATOR FOR CLUTCH WITH ADJUSTABLE STOP

This invention relates to a device for coupling a fly-wheel to a shaft.

Devices are already known for coupling in rotation of a fly-wheel on a shaft, especially in a sewing machine, in which the shaft has, extending from one of its ends, a threaded portion, a cylindrical collar and a drive bush fixed thereto, the fly-wheel mounted to rotate on the cylindrical portion, a clamping block being screwed on the threaded portion to grip the fly-wheel against the drive bush to lock it in rotation to the shaft, the possible angle of rotation of the block on the shaft being limited by a screw gripped in a bore of the block to come into cooperation with a stop finger fast in rotation with the shaft and extending radially with respect to the latter, the bore of the block being parallel to the axis of the shaft.

In a sewing machine, it generally suffices for the clamping block to be unscrewable by about a quarter of a turn to enable the fly-wheel to rotate freely on the shaft. It is preferable to limit the possible angle of rotation to a fairly small value so that it will hardly exceed a half turn and thus to avoid useless movements for the user. To obtain by construction such a limitation of the angle of rotation of the clamping block, it is necessary to observe rather strict manufacturing tolerances.

It is an object of the present invention to enable a limitation in the angle of rotation of the clamping block to be easily provided. This object is attained by means of the fact that the block has at least two bores adapted to receive as desired the said screw to enable it to be placed in that one of the bores which gives the most favourable angle of rotation of the block between the coupling position of the wheel and its uncoupled position.

In order that the invention may be more fully understood, one embodiment of a coupling device according to the invention is described below purely by way of illustrative but non-limiting example with reference to the accompanying diagrammatic drawing, in which.

Figure 1:
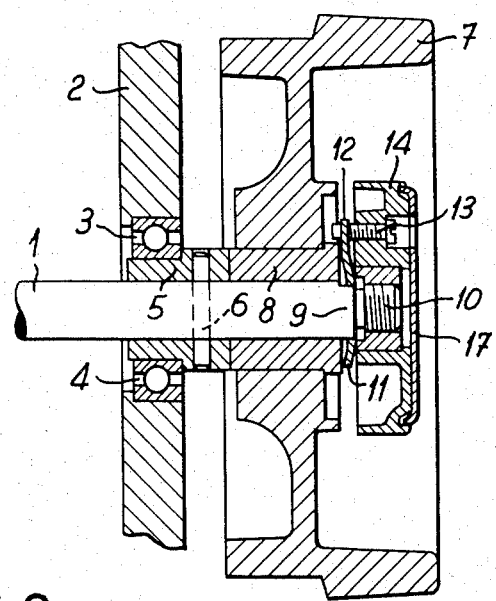
FIG. 1 is a longitudinal section of the end of a shaft of a sewing machine, bearing a fly-wheel, along the line I—I of FIG. 3.
Figure 2:
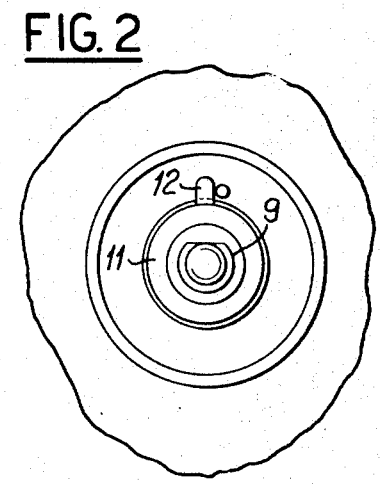
FIG. 2 is a partial end view of this shaft, the clamping block being omitted.
Figure 3:
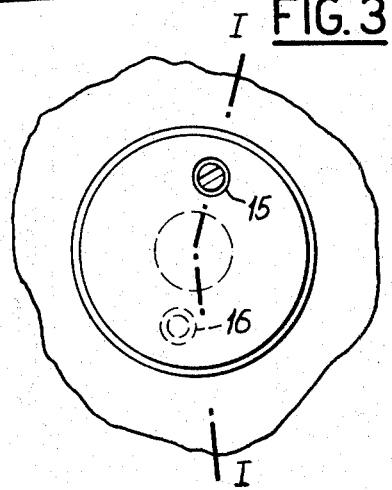
FIG. 3 is a view similar to that of FIG. 2, the clamping block being in position.

With reference to FIGS. 1 to 3, a shaft 1 of a sewing machine passes through a wall 2 of the frame of this machine, with the interposition of a ball bearing block 3, whose inner ring is mounted on a bearing 4 of a bush 5. The latter is fixed on the shaft 1 by a transverse pin 6 and constitutes a drive bush for a fly-wheel 7. The hub of this fly-wheel is formed by a bush 8 rigid therewith and made of material having a low coefficient of friction with the shaft 1.

At its end, the shaft 1 has successively a non-circular portion 9 and a threaded portion 10. The portion 9 bears a washer 11 provided with a radial finger 12 serving as a stop for the end of a screw 13 threaded in a bore of a clamping block 14 mounted on the threaded portion 10.

This clamping block has a hub secured thereto and formed by a metallic bush 14a whose threaded bore cooperates with the threaded portion 10 of the shaft 1. This block 14 has two bores 15 and 16 (FIG. 3) each capable of receiving the screw 13.

The engagement of the fly-wheel 7 with the shaft 1 is effected by rotating the block 14 and bush 14a, which has the effect of exerting axial pressure on the bush 8 against the drive bush 5. This axial pressure is transmitted from the block 14 to the fly-wheel 7 by means of the washer 11 which is convex to give it a certain elasticity. The bearing pressure between the facing surfaces of the hub 8 and the bush 5 provides sufficient frictional force to make the fly-wheel 7 fast in rotation with the shaft 1.

On assembly, the block 14 is fully tightened on the shaft 1, without being provided with its screw 13. The latter is then introduced into that one of the two bores 15 and 16 which is located between a quarter of a turn and three quarters of a turn, in advance of the finger 12, then in clockwise direction. In this way, it is certain to be possible to loosen the block 14 by at least a quarter of a turn, but to a maximum of three quarters of a turn, until the screw 13 comes into abutment against the finger 12.

After positioning of the screw 13, a self-holding disc 17 is applied against the flat surface located on the outer side of the block 14. This disc has only a single hole 17a which is positioned opposite the bore into which the screw 13 has been introduced. This disc 17 contributes to the esthetic appearance of the block 14 by concealing the central orifice of this block and its bore which has not been used for positioning the screw 13. The hole 17a provided in this disc permits access to the screw 13 on possible later dismounting, and is preferably smaller than the diameter of the bores 15, 16, thus preventing the screw from escaping.

Figure 4:
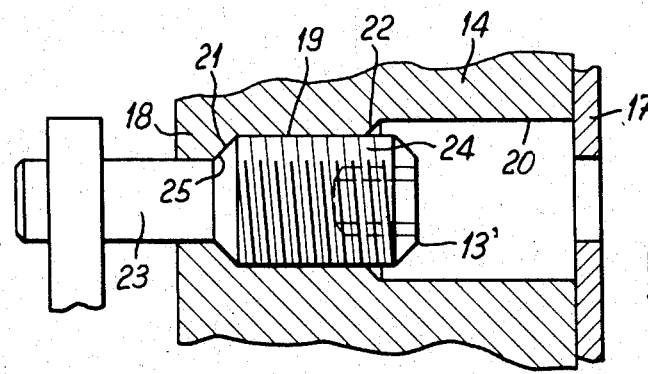
FIG. 4 illustrates in section and on a larger scale a modification of a detail of construction.

FIG. 4 illustrates a modification of the bores of the clamping block 14. In this modification, the clamping block is of synthetic resin and each of its bores is constituted by three cylindrical portions 18, 19 and 20 of increasing diameter from the inner surface to the outer surface. These cylindrical portions are connected between themselves by conical portions 21 and 22 of the same conicity. The screw 13' has a cylindrical portion 23 of diameter cooresponding to the cylindrical portion 18. This portion 23 is connected to a threaded portion 24 of the screw 13' by a conical portion 25 of the same conicity as the conical portions 21 and 22. This arrangement avoids the necessity of forming a tapping in the block 14, since the threading is formed by the screw 13' itself upon its introduction into the bore. This operation is facilitated by the accurate quidance provided by means of the engagement of the collar 23 in the cylindrical portion 18 and by the thrust of the conical portion 25 against the conical portion 22.

I claim:

1. Device for the rotary coupling of a fly-wheel to a shaft, especially in a sewing machine, in which the shaft has, at one of its ends, a threaded portion, a cylindrical portion and a drive bush fixed to said cylindrical portion, the fly-wheel being mounted to rotate on the cylindrical portion of said shaft, a clamping block screwed on the threaded portion of said shaft to clamp the fly-wheel against the drive bush to lock said fly-wheel on the shaft for rotation therewith, said block having at least two bores parallel to the axis of the shaft, a screw threaded in one of said bores, and a stop finger fixed to said shaft and extending radially with respect thereto, the possible angle of rotation of the block on the shaft being limited by said screw coming into contact with said stop finger, said bores arranged to receive said screw to permit its positioning as desired in that particular one of the bores which provides the most favourable angle of rotation of the block between the coupling position of the fly-wheel and its uncoupled position.

2. Device according to claim 1, wherein each bore of the block has a cylindrical portion of larger diameter on the outer side of the block, said cylindrical portion serving as a housing for the head of the screw when engaged in said bore.

3. Device according to claim 1, wherein each bore of the block is constituted by three cylindrical portions, of diameter increasing from the inner surface to the outer surface, said cylindrical portions being connected between themselves by conical portions, the screw having a cylindrical portion of a diameter corresponding to the cylindrical portion of smallest diameter of the bore, the cylindrical portion of the screw being connected to a threaded portion of the latter by a conical portion of the same conicity as the conical portions of the bore, so as to ensure precise guiding of the screw in the bore in its introduction into the latter and enabling female threading to be formed in the bore by screwing the screw into the intermediate cylindrical portion of the bore.

4. Device according to claim 1, wherein the block has on the outer side a flat surface at which said bores open, and a disc covering said flat surface, said disc having a hole adapted to be positioned opposite the bore selected for the introduction of the screw.

5. Device according to claim 2, wherein the block has on the outer side a flat surface at which said bores open, and a disc covering said flat surface, said disc having a hole adapted to be positioned opposite the bore selected for the introduction of the screw.

6. Device according to claim 3, wherein the block has on the outer side a flat surface at which said bores open, and a disc covering said flat surface, said disc having a hole of smaller diameter than the bore and adapted to be positioned opposite the bore selected for the introduction of the screw.

* * * * *